United States Patent [19]

Purpura

[11] Patent Number: 5,732,927
[45] Date of Patent: Mar. 31, 1998

[54] VEHICLE FLAG MOUNTING ASSEMBLY

[76] Inventor: James A. Purpura, 238 Cummings, Bartlett, Ill. 60103

[21] Appl. No.: 423,991

[22] Filed: Apr. 18, 1995

[51] Int. Cl.[6] .................................................. G09F 17/00
[52] U.S. Cl. ..................... 248/539; 116/173; 403/187; 403/192
[58] Field of Search ...................... 116/173; 248/122.1, 248/534, 539, 540; 403/187, 188, 192

[56] References Cited

U.S. PATENT DOCUMENTS

| | | | |
|---|---|---|---|
| D. 313,214 | 12/1990 | Phillips et al. | D12/155 |
| D. 335,254 | 5/1993 | Carter | D8/354 |
| 694,888 | 3/1902 | Pfluger | 248/540 X |
| 984,884 | 2/1911 | Blank | 116/173 |
| 1,206,049 | 11/1916 | Tank | 403/188 X |
| 1,254,524 | 1/1918 | Mink | 116/173 |
| 1,505,883 | 8/1924 | Gleason | 403/188 X |
| 1,804,293 | 5/1931 | Warzoha | 116/173 |
| 1,885,743 | 11/1932 | Magruder | 116/173 |
| 2,831,339 | 4/1958 | Jones | 248/539 X |
| 2,906,234 | 9/1959 | Scott | 116/173 |
| 3,183,886 | 5/1965 | Moffitt | 116/173 |
| 3,477,161 | 11/1969 | Drexler | 116/173 X |
| 3,678,886 | 7/1972 | Tibbet | 116/173 |
| 3,722,841 | 3/1973 | Ciolfi. | |
| 3,797,450 | 3/1974 | Frisbee. | |
| 3,812,815 | 5/1974 | Kuenzel. | |
| 3,825,214 | 7/1974 | Ciolfi. | |
| 3,963,307 | 6/1976 | Kirk. | |
| 4,052,697 | 10/1977 | Daifotes. | |
| 4,632,354 | 12/1986 | Asciutto | 248/539 |
| 4,768,690 | 9/1988 | Stoutenburg | 224/273 |
| 4,796,553 | 1/1989 | Cogswell et al. | 116/173 |
| 5,039,048 | 8/1991 | Paxton | 116/173 X |

FOREIGN PATENT DOCUMENTS

| | | | |
|---|---|---|---|
| 694509 | 8/1940 | Germany | 116/173 |
| 3441562 | 5/1986 | Germany | 403/188 |

*Primary Examiner*—John A. Ricci
*Attorney, Agent, or Firm*—Wallenstein & Wagner, Ltd.

[57] ABSTRACT

A flag display assembly for a vehicle having a license plate assembly including a mast, a plurality of mast support members having a gripping collar and an arm integral with the gripping collar. The gripping collar includes an opening with an inner diameter for receiving the mast and gripping the mast. The arm of the mast support member includes a flat surface for abutment of the arm upon a surface of the vehicle license plate assembly, and includes a hole for receiving a fastener, such as a bolt, for securing to the license plate assembly. The display assembly further includes at least one flag attachment assembly preferably including an attachment member which has a gripping ring and an attachment blade which is secured to the flag directly, or to a shoe attached to the flag.

10 Claims, 1 Drawing Sheet

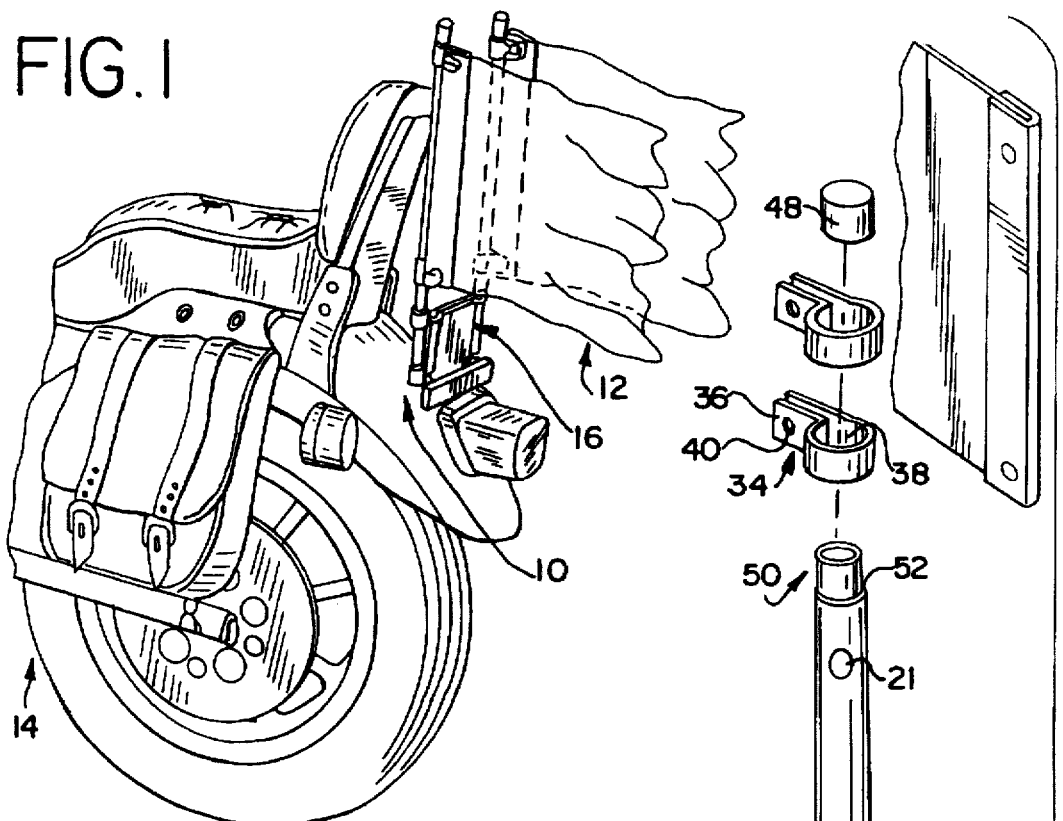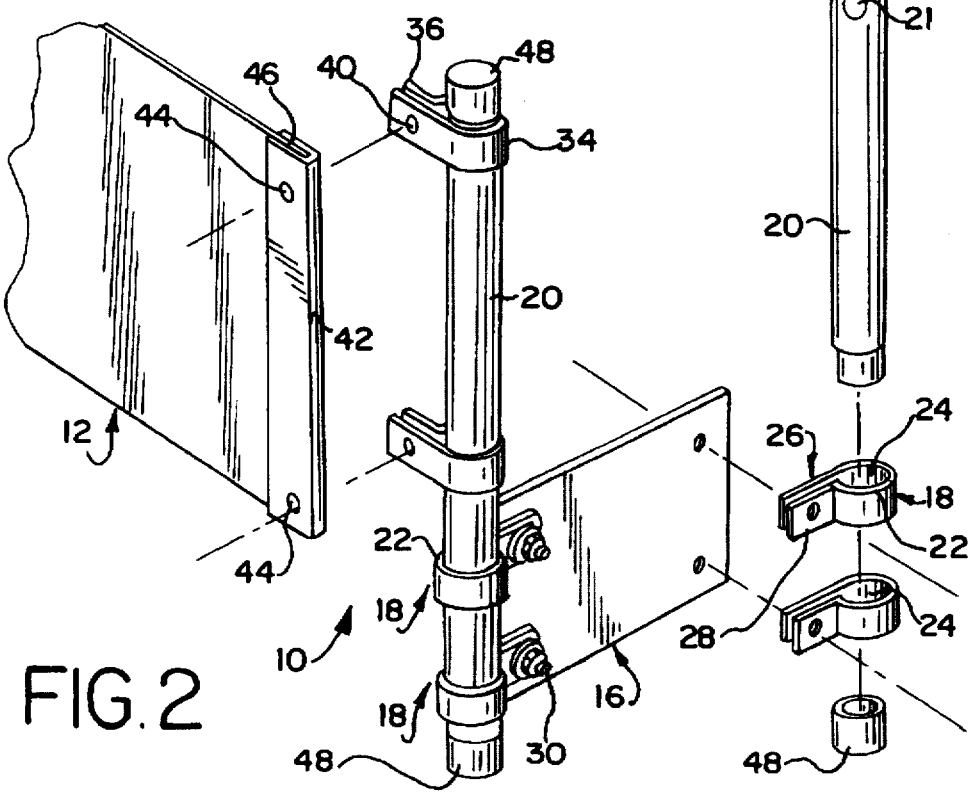

VEHICLE FLAG MOUNTING ASSEMBLY

TECHNICAL FIELD

The present invention relates to a flag display apparatus for a vehicle which has a license plate attachment. More specifically, this invention relates to an improved flag display assembly which includes a mast and at least one mast support member which is attached to the license plate assembly of the vehicle, and the flag is securely attached to the mast.

BACKGROUND OF THE INVENTION

It has become customary to display a flag on a vehicle, either for safety or for decoration. Although there are several prior art mounting assemblies for attaching flags to vehicles, such prior art structures are deficient as a means of securely displaying a flag on vehicles which are able to travel at high rate of speed, or for vehicles with very little frame available for such attachment.

For example, it has become customary to display a flag on a motorcycle for decoration, or to display a flag on a boat for safety or decoration. However, because such vehicles are able to travel at a high rate of speed and thereby incur a great amount of wind resistance, the flag must be placed securely, and preferably in a position near the rear of the vehicle, where the wind resistance on the flag will be minimized and the flag will not be in the way of the person operating the vehicle.

In the case of displaying a flag from a motorcycle, the prior practice has typically been to mount the flag to a rear luggage rack. Since the luggage rack is typically made of chrome tubing, the flag is usually mounted to the rack by attaching a bracket to the rack tubing.

An example of one such bracket is shown in U.S. Pat. No. Des. 335,254. A U-shaped portion of the mounting bracket is fitted around the tubing and is secured by tightening around the tubing, and a similar other U-shaped portion of the bracket is available for securing the mast of a flag. This flag mounting bracket, however, is of no use if the motorcycle does not have a luggage rack or any other tubing suitable for mounting a flag. Further, this mounting bracket provides only one point of securing the mast of the flag, and the single point of mounting would be at the bottom of the mast. In the event that strong wind resistance is exerted upon the flag carried at the top of the mast, the mast may bend or break, or the flag and mast may be pulled from the bracket.

Another device for mounting a flag to a luggage rack on a motorcycle, or other tubing such as a rear bumper bar, is disclosed in U.S. Pat. No. 4,632,354. That type of mount, however, requires the use of a horizontal mounting plate which is attached to the motorcycle. Further, this type of mount is only possible if there is a place on the vehicle which is accessible for the mounting assembly, such as when there is a luggage rack on the motorcycle. Also, much like other prior art mounting assemblies, this mount provides only one point of attachment of the flag mast, and it is an attachment at the bottom of the mast. In the event that strong wind resistance is exerted upon the flag carried near the top of the mast, the mast may bend or break, or the flag and mast may be pulled from the bracket.

There are other prior art flag mounting assemblies available as well. One alternative is by direct attachment of a flag bracket and a flag storage tube to the body or frame vehicle, such as in U.S. Pat. No. 4,768,690. In order to display the flag, a person removes the flag from the storage tube and places it into the flag bracket. That flag display assembly, however, requires drilling holes for the bracket or welding the bracket to the vehicle. Either way, the result is damage to the surface of the vehicle body, greater difficulty and time in mounting the assembly, and the inability or difficulty of removing the assembly from the vehicle. Furthermore, this type of flag display assembly is intended for use on a slow-moving vehicle, and is not well suited for a faster moving vehicle, as the flag would likely dislodge form the flag bracket when wind resistance is upon the flag. Also, this type of flag mounting is obviously not possible for certain vehicles, such as a motorcycle, where there is no part of the vehicle body which is suitable for mounting a flag.

Other types of mounting assemblies for displaying a flag attached to a vehicle include: (1) mounting the flag by suction cups, such as in U.S. Pat. No. 3,797,450; (2) mounting the flag from a support which is attached to the top of a window or such, as disclosed in U.S. Pat. No. Des. 313,214; or, (3) mounting the flag to the axle of the vehicle, such as in U.S. Pat. Nos. 3,812,815 and 3,722,841. However, it is often not possible to utilize such mounting assemblies. As examples, there may not be a suitable surface available for attaching suction cups, there will often not be a window or other suitable place for a support member, and the axle of the vehicle is often not a suitable place for attaching a flag. Further, such mounting assemblies are not practical or reliable for a motor vehicle which will be traveling at fast speeds. Also, these types of mounting assemblies require displaying the flag in a place which would likely obstruct the view and performance of the person operating the vehicle.

In light of the above, there is certainly a need for a suitable flag display assembly which mounts to the vehicle in a manner that is easily removed and is secure when the vehicle travels at a high rate of speed and wind resistance is exerted on the flag. As a specific example, the need exists for a suitable flag display assembly for securely mounting a flag to a motorcycle, especially when there is no luggage rack available for securing a mounting assembly.

The present invention provides a flag display assembly which conveniently mounts to the license plate assembly of the vehicle, such as a motorcycle, a boat or a boat trailer. The mounting assembly of the present invention provides secure attachment for travel at higher speeds, and allows the flag to be displayed in a non-obtrusive and useful manner.

SUMMARY OF THE INVENTION

It is an object of the present invention to provide a flag display assembly for a vehicle having a license plate assembly. The flag assembly includes a mast, and a plurality of mast support members having a gripping collar and an arm which is integral with the gripping collar. The gripping collar has an opening which has an inner diameter for receiving the mast and gripping the mast. The arm of the support member has a substantially flat surface which has an opening for receiving a fastener as the assembly is attached to the license plate assembly of the vehicle.

It is further an object of the present invention to provide a flag display assembly in which the gripping collar and arm of the support member includes a continuous band of rigid material, and the arm is made up of two blades, one blade being integral with a first end of the gripping collar, and the other blade being integral with a second end of the gripping collar. It is further contemplated that the opening of the gripping collar is substantially circular, and that the inner diameter of the gripping collar opening is decreased around the mast as the two blades of the arm are drawn together.

Other advantages and aspects of the present invention will become apparent upon reading the following description of the drawings and detailed description of the invention.

BRIEF DESCRIPTION OF THE DRAWINGS

FIG. 1 illustrates a side perspective view of a tail end of a motorcycle with a license plate assembly and two flags mounted according to the preferred embodiment of the flag display assembly of the present invention.

FIG. 2 illustrates the license plate assembly and the exploded view and the partial exploded view of the flag display assembly according to the present invention, as it is shown in FIG. 1.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

The flag display assembly 10 of the present invention provides secure attachment of a flag 12 to a vehicle 14 which has a license plate assembly 16. As is best shown in FIG. 2, the display assembly 10 includes a plurality of support members 18 and a mast 20. Each support member 18 includes a gripping collar 22. The gripping collar 22 has a collar opening 24 which has an inner diameter of slightly greater diameter than the outer diameter of the mast 20, such that the gripping collar 22 is fitted around the mast 20.

Each support member 18 also includes an arm 26 which preferably has at least one flat surface for abutment against the license plate assembly 16 of the vehicle, and each has a hole 28 for receiving a fastener to fasten to the license plate assembly 16. Because the typical license plate assembly of a vehicle includes a bolt 30 and a nut 32 for attaching the license plate, it is preferable for the hole 28 of the arm 26 to be a round hole and suitable for receiving a bolt 30 from the license plate assembly 16. However, other fasteners are possible, and it is therefore contemplated by the present invention that the hole 28 of the arm 26 may be of some other size or dimension.

In the preferred embodiment, the support member 18 is made up of one continuous band of semi-rigid material, such as metal or plastic. According to this embodiment, the arm 26 and the gripping collar 22 are constructed from a continuous band of material. Further, it is preferable that the arm 26 is made up of the two ends of the continuous band, such that, as the two ends are drawn together, the inner diameter of the collar opening 24 of the gripping collar 22 is reduced. According to this embodiment, therefore, the two parts of the arm 26 are drawn together, and the gripping collar 22 tightens upon the mast 20, as the arm 26 is fastened to the license plate assembly 16.

In the preferred embodiment, the mast 20 is mounted to the license plate assembly 16 with two such support members 18. This provides greater stability of the mast 20 than having just one place of attachment. The mast 20, therefore, is less likely to be unintentionally removed during use of the vehicle 14. Also, using two support members 18 in spaced relationship better supports the mast 20 at the place where the mast 20 would experience a stress due to wind resistance upon the flag 12.

The flag display assembly 10 also provides for attachment of the flag 12 to the mast 20. In the preferred embodiment, the flag 22 is attached to the mast 20 by at least two ring members 34, each including an attachment blade 36. The ring member 34 includes an opening 38, such that the mast 20 is received within the opening 38 and may be secured in position along the length of the mast 20. The attachment blade 36 of the ring member 34 includes a hole 40 suitable for receiving a fastener (not shown), such as a bolt, for attaching the flag 12. Further, in the preferred embodiment, the display assembly includes a shoe 42 having at least one hole 44 and suitable for attachment to a flag edge According to this embodiment, the hole 40 of the attachment blade 36 is aligned with the hole 44 of the shoe 42, and the flag 12 is attached as the fastener (not shown) passes through the aligned holes.

It is contemplated that there are other alternatives for the attachment of the flag 12 to the mast 20. For example, there may be provided a plurality of holes 21, FIG. 2, in the mast 20 which would be aligned with holes of the flag, such that a fastener may pass through the holes and the flag 12 secured in place along its edge.

Also in the preferred embodiment, a cap 48 receives the top and/or bottom end of the mast 20. The cap 48 has an inner dimension suitable for receiving the outer diameter of the end 50 of the mast 20. Alternatively, the end 50 of the mast 20 may have a recess 52 of its outer diameter, such that when the cap 48 receives the end 50 of the mast, the outer surface of the mast 20 is relatively flush with the outer surface of the cap 48.

In alternative embodiment, the support member 18 is solely comprised of the blade portion of arm 26. The blade is attached to the mast 20 by welding. The blade portion has an opening 28 for receiving a bolt 30 to mount the blade to the license plate assembly 16. In this embodiment, the mast 20 can be mounted to the license plate assembly 16 using one or more blades which are welded to the mast 20.

While the specific embodiments have been illustrated and described, numerous modifications come to mind without significantly departing from the spirit of the invention and the scope of protection is only limited by the scope of the accompanying claims.

I claim:

1. A flag display assembly for a vehicle having a license plate assembly, comprising:

a mast;

a plurality of mast support members having a gripping collar and an arm integral with said gripping collar;

each said gripping collar having an opening with an inner diameter for receiving the mast and gripping the mast;

said arm of each support member having a substantially flat surface for abutment upon a surface of the vehicle; and, said flat surface of each arm having an opening for receiving a fastener means for attachment to the license plate assembly of said vehicle.

2. The display assembly according to claim 1, wherein each said gripping collar and arm of each support member includes a continuous band of rigid material.

3. The display assembly according to claim 2, wherein each said arm is made up of two blades, one blade being integral with a first end of the gripping collar, and the other blade being integral with a second end of the gripping collar.

4. The display assembly according to claim 3, wherein said opening of the gripping collar is substantially circular.

5. The display assembly according to claim 4, wherein said inner diameter of the gripping collar opening is decreased around the mast as the two blades of the arm are drawn together.

6. A flag display assembly according to claim 1, further comprising:

a means for securing a flag to said mast provided by a flag attachment member secured to said mast.

7. A flag display assembly according to claim 6, wherein said means for securing a flag to said mast includes a shoe having a plurality of holes and which is secured to an edge of the flag such that at least one of the holes of the shoe is aligned with a hole in said attachment member.

8. A flag display assembly according to claim 1, wherein a means for securing the flag to said mast is provided by a plurality of holes in said mast for receiving bolts which pass through openings of the flag.

9. The flag display according to claim 8, wherein said means for securing a flag to said mast includes a shoe having a plurality of holes, and which is secured to an edge of the flag such that at least one of the holes of the shoe is aligned with one of said holes in said mast.

10. A flag display assembly for secure attachment to a vehicle having a substantial vertical license plate assembly, comprising:

a mast;

a mounting member secured to said mast;

means for attaching said mounting member to the license plate assembly of the vehicle, such that said mast is substantially vertical; and, means for securing a flag to said mast.

said means for attaching the mounting member to the license plate assembly comprises a gripping collar which receives said mast and is secured as it is tightened around the mast; and, said gripping collar includes a mounting blade which has a flat surface for abutment to a flat surface of a license plate assembly, and includes an opening for receiving a bolt to mount said gripping collar to the license plate assembly.

* * * * *

UNITED STATES PATENT AND TRADEMARK OFFICE
CERTIFICATE OF CORRECTION

PATENT NO. : 5,732,927
DATED : Mar. 31, 1998
INVENTOR(S) : James A. Purpura

It is certified that error appears in the above-indentified patent and that said Letters Patent is hereby corrected as shown below:

In Column 4, line 10, insert --46-- after "edge".

Signed and Sealed this

Eighth Day of September, 1998

Attest:

BRUCE LEHMAN

*Attesting Officer*    *Commissioner of Patents and Trademarks*